(12) United States Patent
Razavi et al.

(10) Patent No.: US 6,541,413 B1
(45) Date of Patent: Apr. 1, 2003

(54) PROCESS FOR PRODUCING POLYOLEFINS AND POLYOLEFIN CATALYST

(75) Inventors: Abbas Razavi, Mons (BE); Guy L. G. Debras, Les Bons Villers (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 08/459,526

(22) Filed: Jun. 2, 1995

Related U.S. Application Data

(62) Division of application No. 08/224,604, filed on Apr. 7, 1994, now Pat. No. 5,719,241.

(30) Foreign Application Priority Data

Apr. 7, 1993 (EP) .............................................. 93870064

(51) Int. Cl.⁷ ................................................. B01J 31/00

(52) U.S. Cl. ........................ 502/152; 502/117; 502/155; 526/119; 526/160

(58) Field of Search ................................. 502/117, 152, 502/155; 526/119, 160

(56) References Cited

U.S. PATENT DOCUMENTS

| | | | | |
|---|---|---|---|---|
| 4,897,455 A | * | 1/1990 | Welborn, Jr. ................. | 526/129 |
| 4,935,474 A | * | 6/1990 | Ewen et al. ................. | 526/114 |
| 5,252,529 A | * | 10/1993 | Ueda et al. .................. | 502/113 |
| 5,281,679 A | * | 1/1994 | Jejelowo et al. ............. | 526/114 |
| 5,374,700 A | * | 12/1994 | Tsutsui et al. ........... | 526/348.3 |
| 5,455,316 A | * | 10/1995 | Tsutsui et al. .............. | 526/114 |
| 5,506,183 A | * | 4/1996 | Sano et al. .................. | 502/113 |

* cited by examiner

*Primary Examiner*—David W. Wu
*Assistant Examiner*—Ling-Siu Choi
(74) *Attorney, Agent, or Firm*—William D. Jackson

(57) ABSTRACT

The present invention provides a process for preparing polyolefins having a multimodal or at least bimodal molecular weight distribution by contacting in a reaction mixture under polymeriation conditions at least one olefin and a catalyst system comprising a supported catalyst-component comprising an alumoxane and at least two metallocenes containing the same transition metal and selected from the group consisting of mono, di, and tri-cyclopentadienyls and substituted cyclopentadienyls of a transition metal and wherein at least one of the metallocenes is bridged and at least one of the metallocenes is unbridged.

4 Claims, 20 Drawing Sheets

PROCESS FOR PRODUCING POLYOLEFINS AND POLYOLEFIN CATALYST

This application is a division of pending prior Application Ser. No. 08/224,604, filed Apr. 7, 1994, now U.S. Pat. No. 5,719,241.

TECHNICAL FIELD OF THE INVENTION

This invention relates to a method for preparing polyolefins having a bi- or multimodal molecular weight distribution. This invention also relates to a polyolefin polymerization catalyst system. This invention further relates to a method for preparing an olefin polymerization catalyst system.

BACKGROUND OF THE INVENTION

Polyolefins having a multimodal molecular weight distribution (MWD) can be converted into articles by extrusion molding, thermoforming, rotational molding, etc. and have advantages over typical polyolefins lacking the multimodal MWD. Polyolefins having a multimodal MWD may be processed more easily, i.e. they can be processed at a faster throughput rate with lower energy requirements and at the same time such polymers evidence reduced melt flow perturbations and are preferred due to improved properties for applications such as high strength films.

There are several known methods for producing polyolefins having a multimodal MWD; however, each method has its own disadvantages. Polyolefins having a multimodal MWD can be made by employing two distinct and separate catalysts in the same reactor each producing a polyolefin having a different MWD; however, catalyst feed rate is difficult to control and the polymer particles produced are not uniform in size, thus, segregation of the polymer during storage and transfer can produce non-homogeneous products. A polyolefin having a bimodal MWD can also be made by sequential polymerization in two separate reactors or by blending polymers of different MWD during processing; however, both of these methods increase capital cost.

European Patent No. 0128045 discloses a method of producing polyethylene having a broad molecular weight distribution and/or a multimodal MWD. The polyethylenes are obtained directly from a single polymerization process in the presence of a catalyst system comprising two or more metallocenes each having different propagation and termination rate constants, and aluminoxane.

There are certain limits to the known methods for preparing bimodal molecular weight distribution or multimodal molecular weight distribution polyolefins. Even under ideal conditions the gel permeation chromatograph curves don't show a marked bimodal MWD of the polyolefin. The MWD and shear rate ratios of the polymer and the catalyst activity disclosed in the known methods are rather poor. Further the known metallocene catalyst systems for producing bimodal MWD use aluminoxane as cocatalyst during the polymerization which causes severe fouling inside the reactor and renders the use of such a type of catalyst in continuous processes almost impossible.

It is therefore not surprising that none of the known methods for producing a multimodal MWD polyolefin from a single polymerization process in the presence of a catalytic system comprising at least two metallocenes have been developed at an industrial scale.

It is an object of the present invention to provide for a new process for preparing polyolefins having a multimodal molecular weight distribution. It is an object of the present invention to provide a new high activity polymerization catalyst system. It is a further object of the present invention to provide for a new process for preparing the polymerization catalyst system of the present invention.

SUMMARY OF THE INVENTION

In accordance with the present invention, polyolefins having a multimodal or at least bimodal molecular weight distribution are prepared by contacting in a reaction mixture under polymerization conditions at least one olefin, a catalyst system comprising (a) a supported catalyst-component comprising an alumoxane and at least two metallocenes containing the same transition metal and selected from mono, di, and tri-cyclopentadienyls and substituted cyclopentadienyls, of a transition metal wherein at least one of the metallocenes is bridged and at least one of the metallocenes is unbridged and (b) a cocatalyst.

While alumoxane can be used as a cocatlyst, the Applicant has found that is was not necessary to use alumoxane as cocatalyst during the polymerization procedure for preparing polyolefins according to the process of the present invention. Further the use of alumoxane as a cocatlyst during the polymerization may lead to the fouling of the reactor.

According to a preferred embodiment of the present invention, one or more cocatalysts represented by the formula $MR_x$ are used, wherein M is a metal selected from Al, B, Zn, Li and Mg, each R is the same or different and is selected from halides or from alkoxy or alkyl groups having from 1 to 12 carbon atoms and x is from 1 to 3. Especially suitable cocatalysts are trialkylaluminium selected from trimethylaluminium, triethylaluminium, triisobutylaluminium, tri-n-hexylaluminium or tri-n-octylaluminium, the most preferred being triisobutylaluminium.

In accordance with the present invention the broadness of the molecular weight distribution and the average molecular weights can be controlled by selecting the catalyst system. In a preferred embodiment of the present invention, this control is also preferred by the introduction of some amount of hydrogen during polymerization. Another preferred embodiment of the present invention implies the use of a comonomer for this control; examples of comonomer which can be used include 1-olefins such as 1-butene, 1-hexane, 1-octene, 4-methyl-pentene, and the like, the most preferred being 1-hexene.

It has unexpectedly been found that the polymerization process can be conducted under slurry phase polymerization conditions and this constitutes a real advantage of the process of the present invention. While slurry phase polymerization may be conducted under well known operating conditions, it is preferred that it is operated at a temperature of about 20 to 125° C. and a pressure of about 0.1 to 5.6 MPa for a time between 10 minutes and 4 hours.

Another advantage of the present invention is that a continuous reactor can be used for conducting the polymerization. This continuous reactor is preferably a loop reactor. During the polymerization process, the olefin monomer(s), the catalytic system, the cocatalyst and a diluent are flowed in admixture through the reactor.

A further advantage of the present invention is that the bulk density of the polymer obtained by the process of the present invention is particularly high. The bulk density is an important characteristic of the polymer. The bulk density, commonly expressed in terms of grams per cubic centimeters, should be relatively high. If the bulk density is too low, the polymer will tend to be fluffy and will tend to cause plugging and handling problems in the product transfer system. Low bulk densities mean problems for fluff packaging and for the extrusion processing. This is particularly important in a continuous or a semi-continuous polymerization where plugging of the withdrawal outlet or another point in the polymerization system can cause serious interruptions in production schedules.

According to the present invention when hydrogen is used it is preferred that the relative amounts of hydrogen and olefin introduced into the polymerization reactor be within the range of about 0.001 to 15 mole percent hydrogen and 99.999 to 85 mole percent olefin based on total hydrogen and olefins present, preferably about 0.2 to 3 mole percent hydrogen and 99.8 to 97 mole percent olefin.

It is preferred that the polymerization reaction be run in a diluent at a temperature at which the polymer remains as a suspended solid in the diluent. Diluents include, for examples, isobutane, n-hexane, n-heptane, methylcyclohexane, n-pentane, n-butane, n-decane, cyclohexane and the like. The preferred diluent is isobutane.

The olefin monomer used in the process of the present invention to produce a polyolefin of bimodal of multimodal molecular weight distribution in which each polymer particle contains both high and low molecular weight polymer molecules is preferably selected from ethylene and mono-1-olefins (alpha olefins), preferably mono-1-olefins having from 2 to 10 carbon atoms including for example, 4-methyl-1-pentene. More preferably these mono-1-olefins are selected from the group consisting of ethylene, propylene, and mixtures thereof; ethylene being the most preferred.

DETAILED DESCRIPTION OF THE INVENTION

Figure 1:
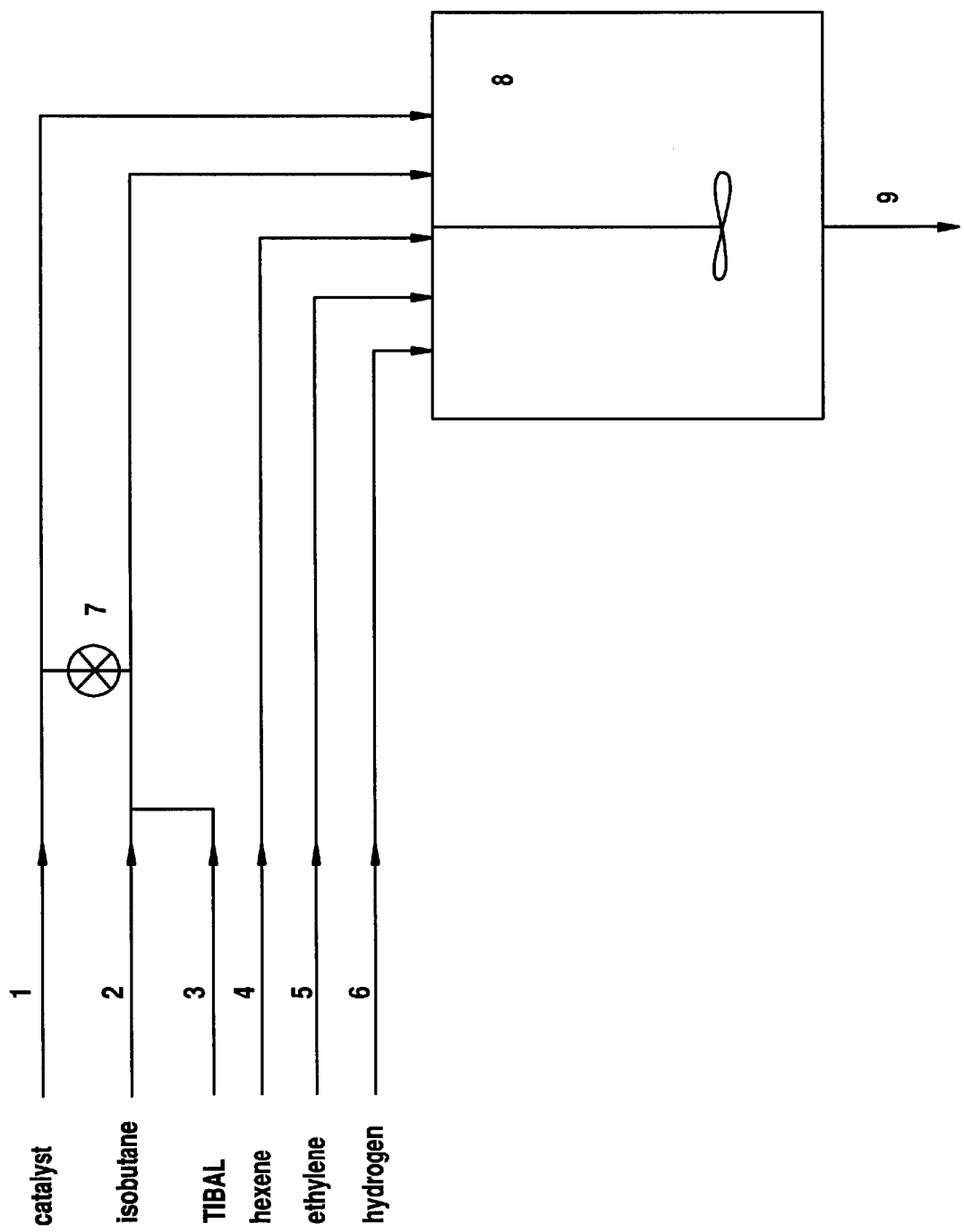
FIG. 1 is a schematic diagram showing one embodiment of the present invention.
Figure 2:
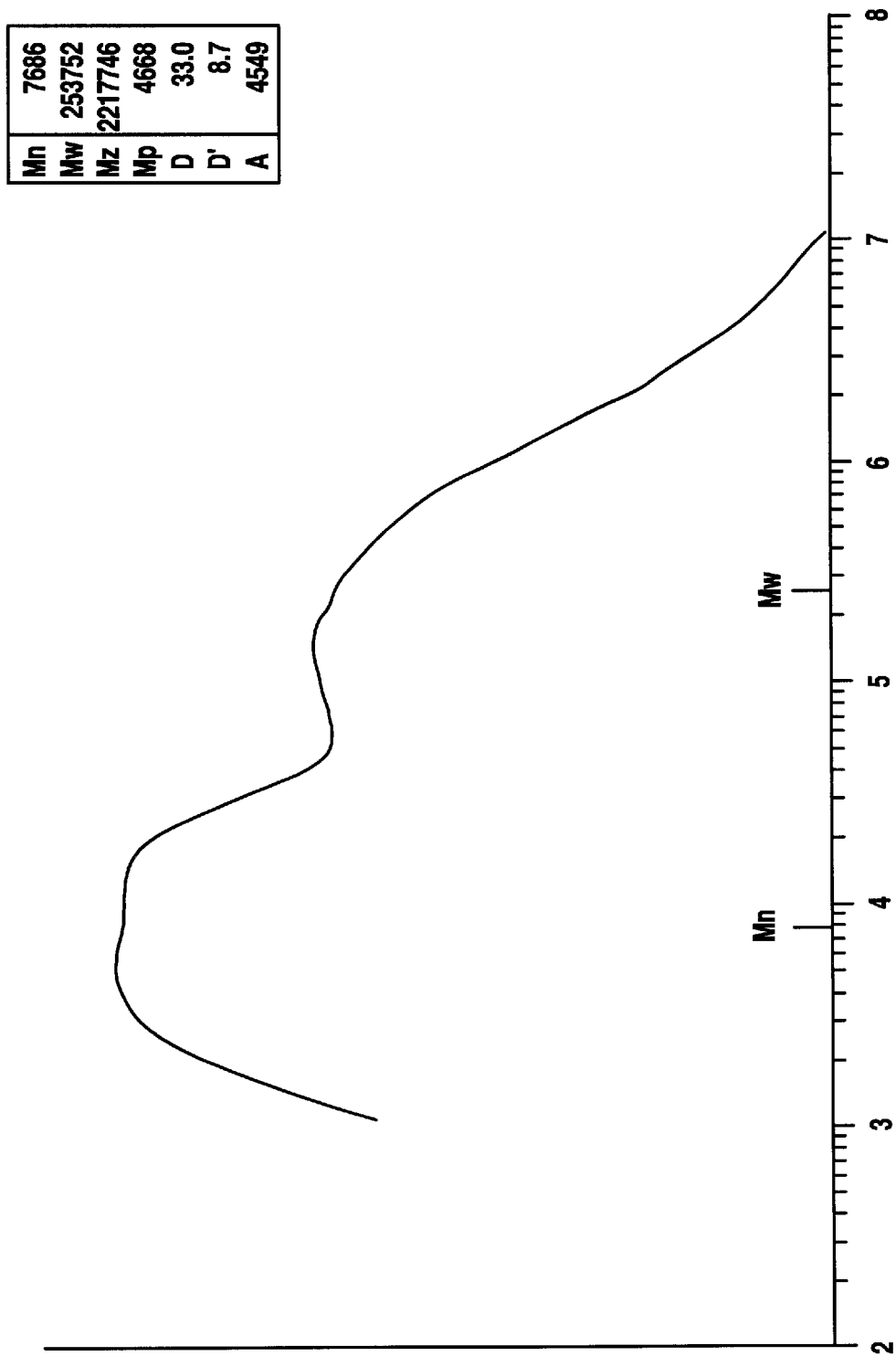
FIGS. 2 through 20 are graphs showing the corresponding results for Examples 5 through 23, respectively, set forth in Table 2.
Figure 3:
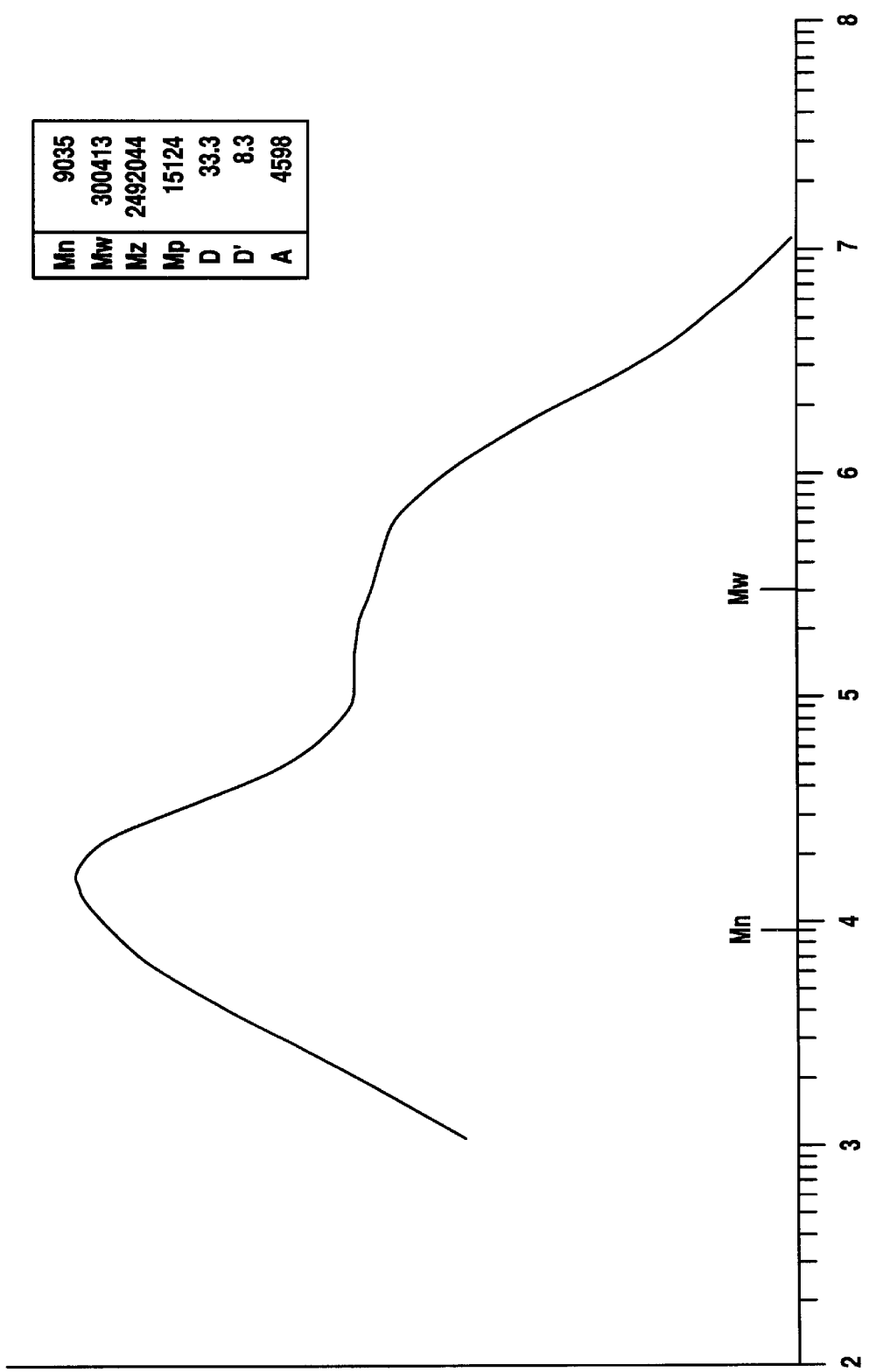
Figure 4:
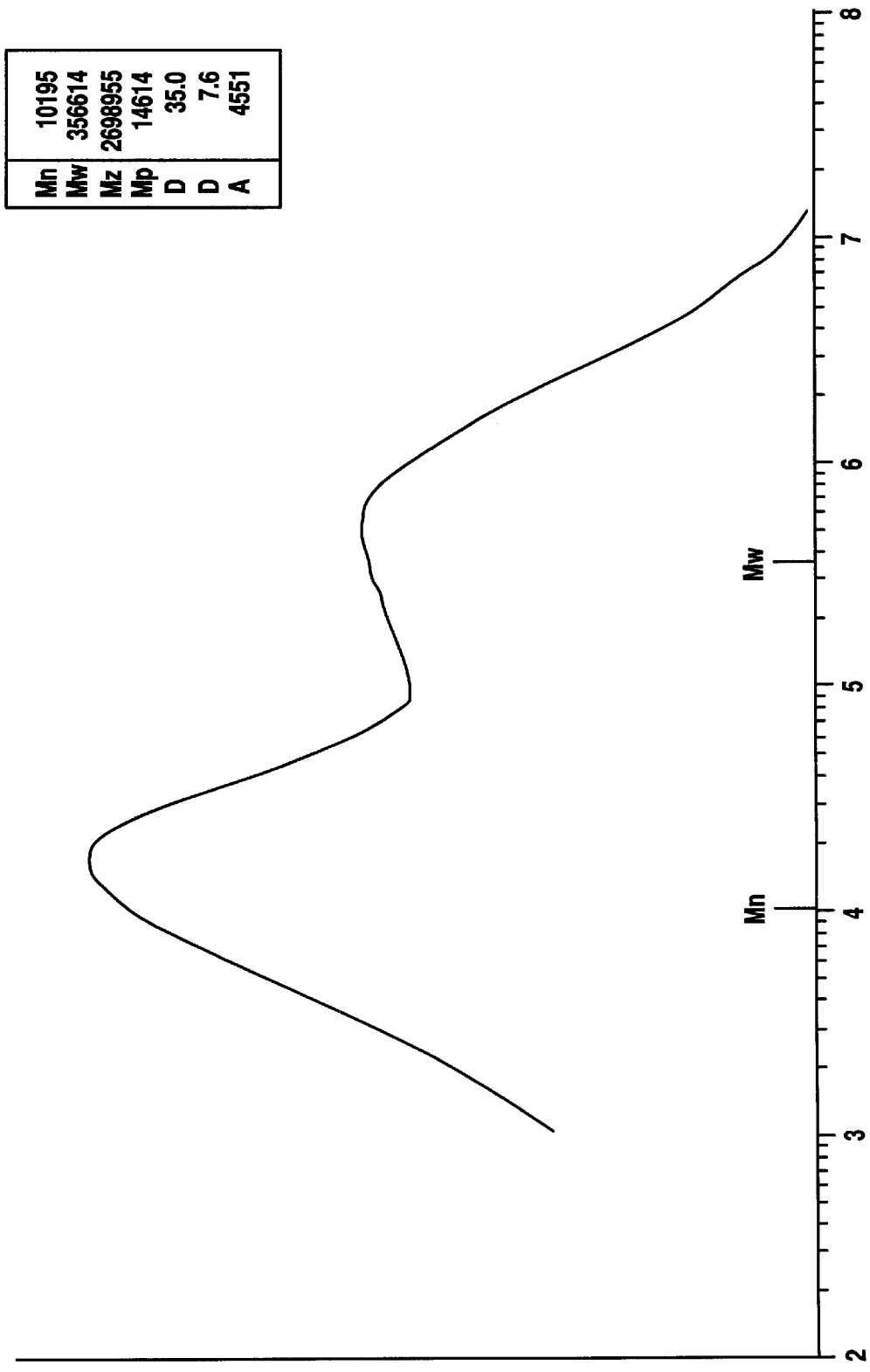
Figure 5:
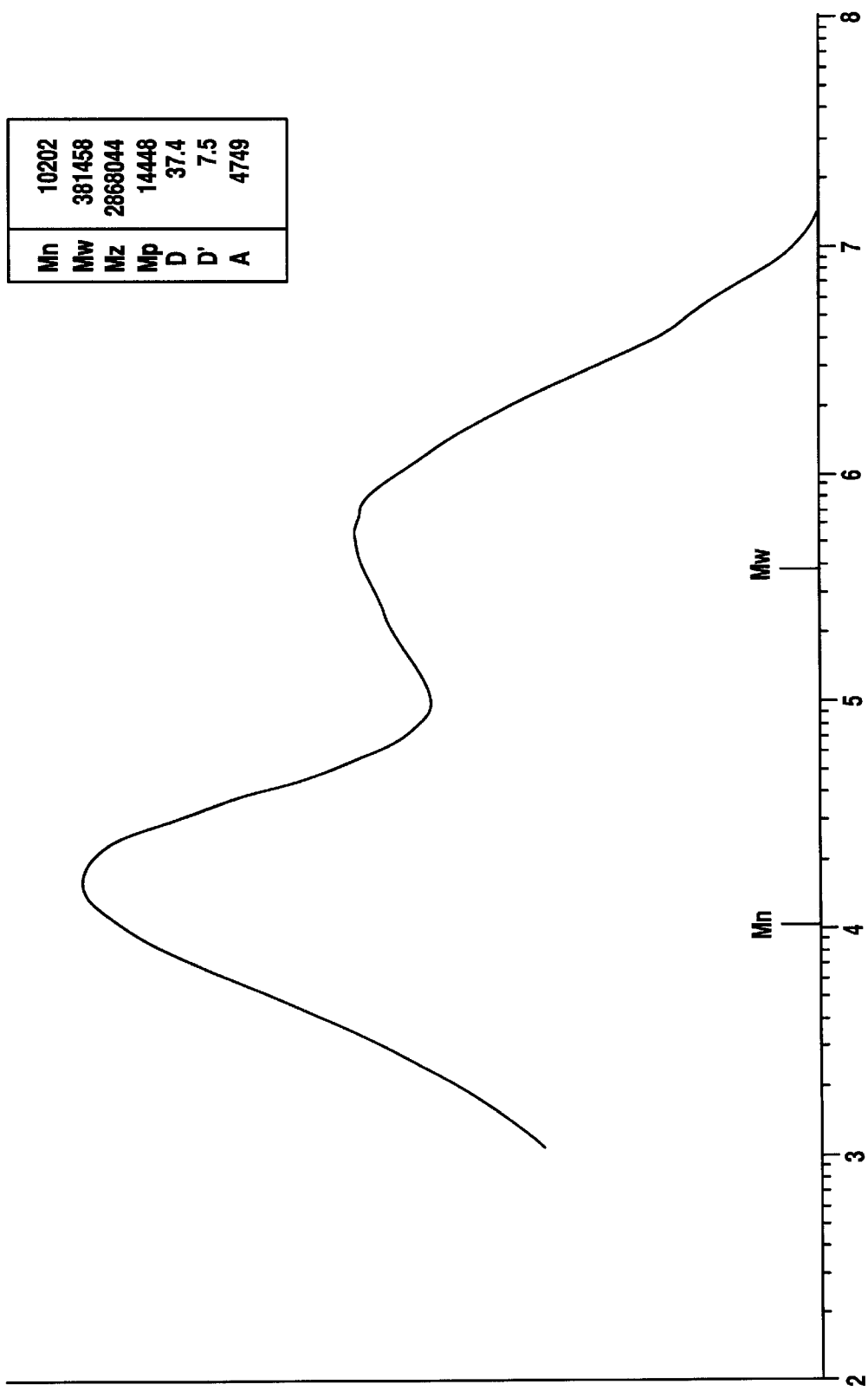
Figure 6:
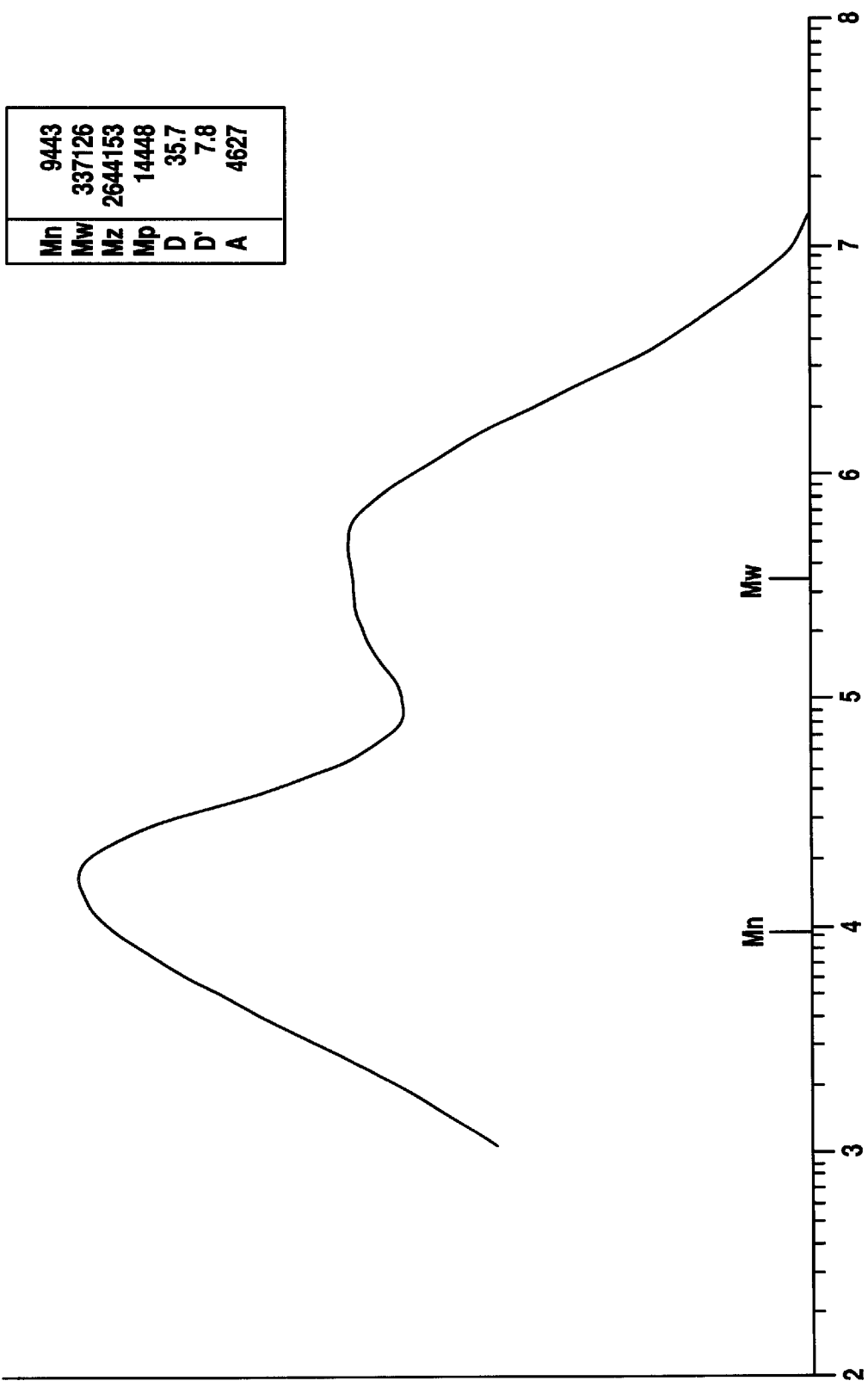
Figure 7:
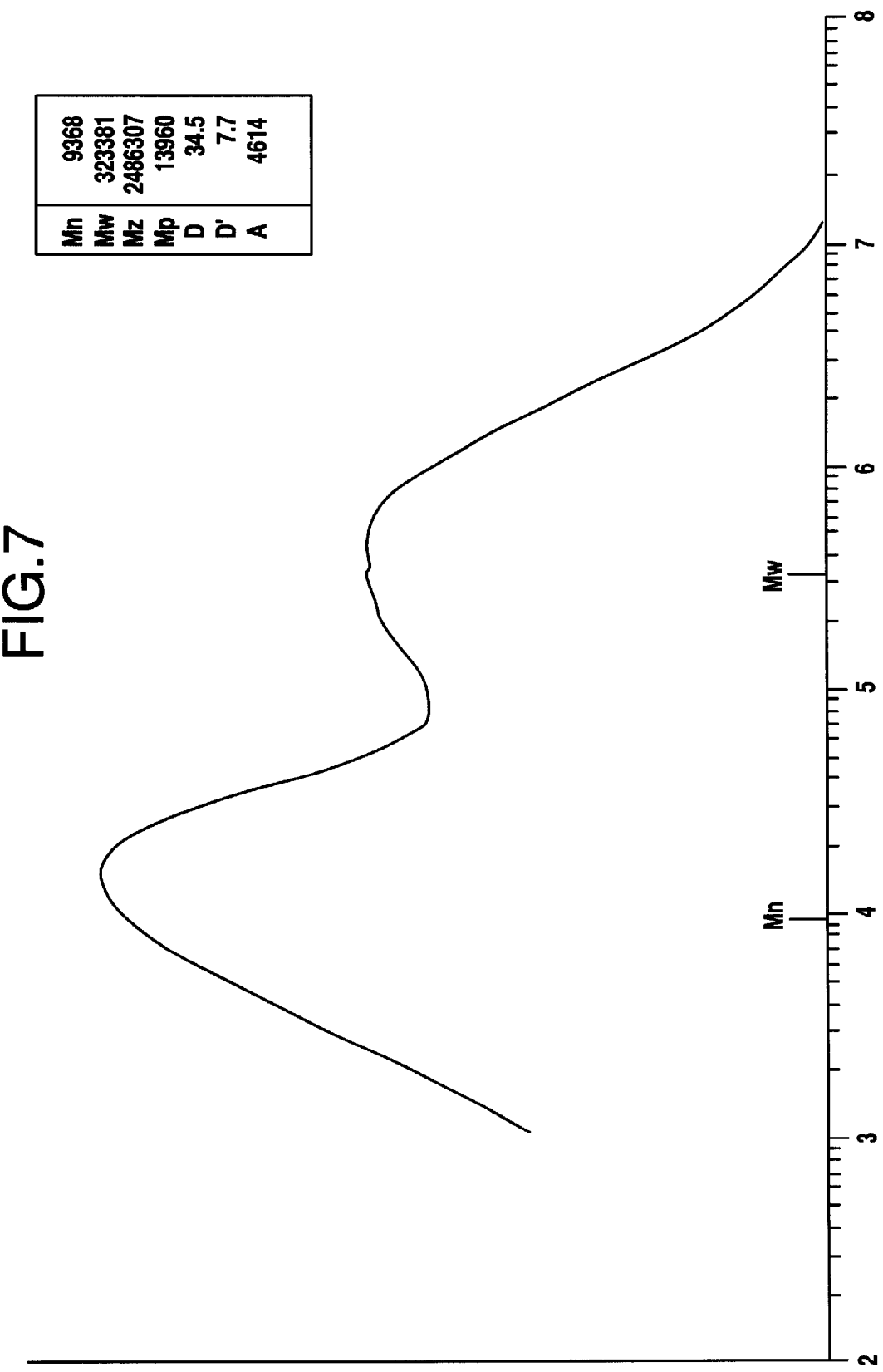
Figure 8:
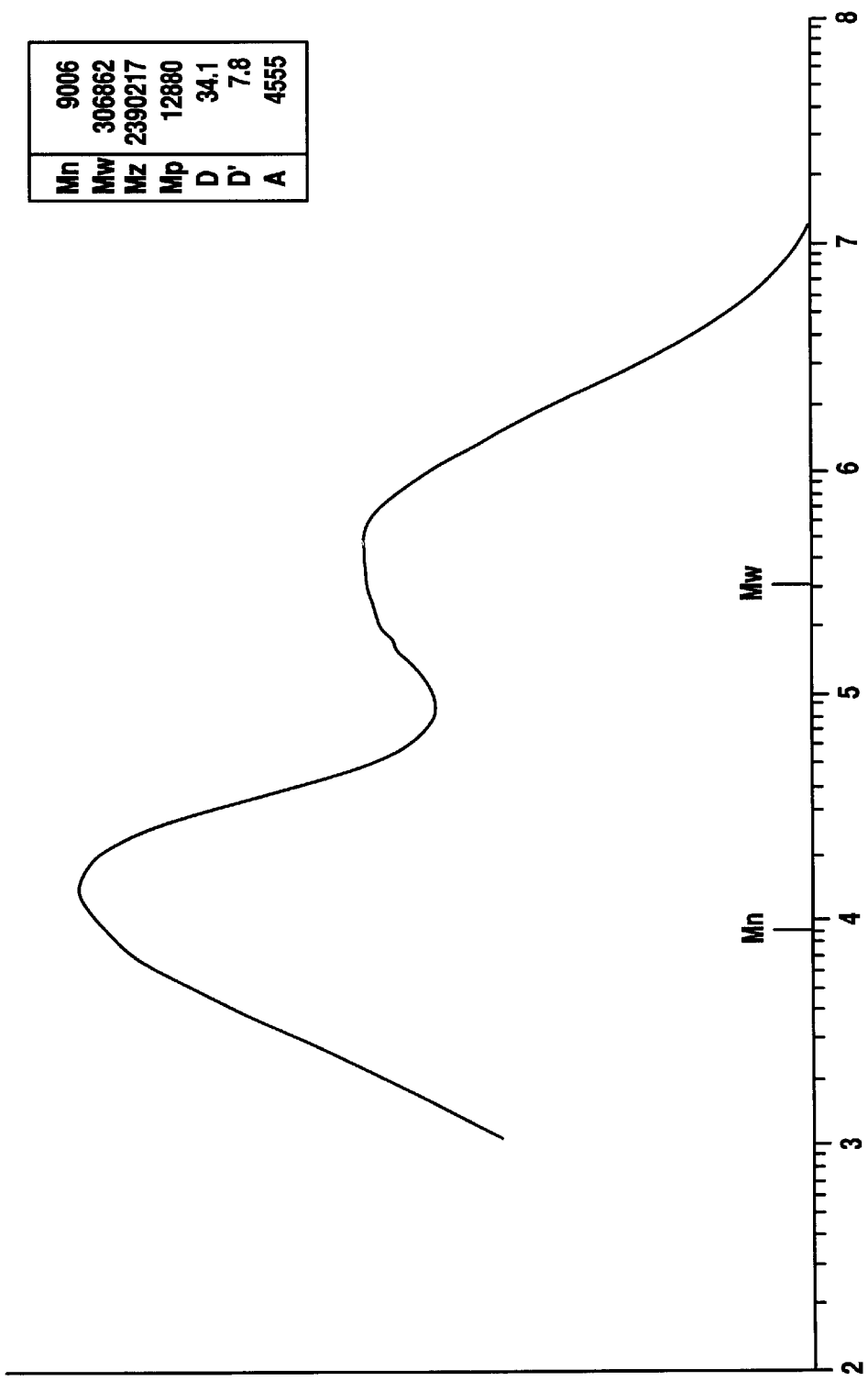
Figure 9:
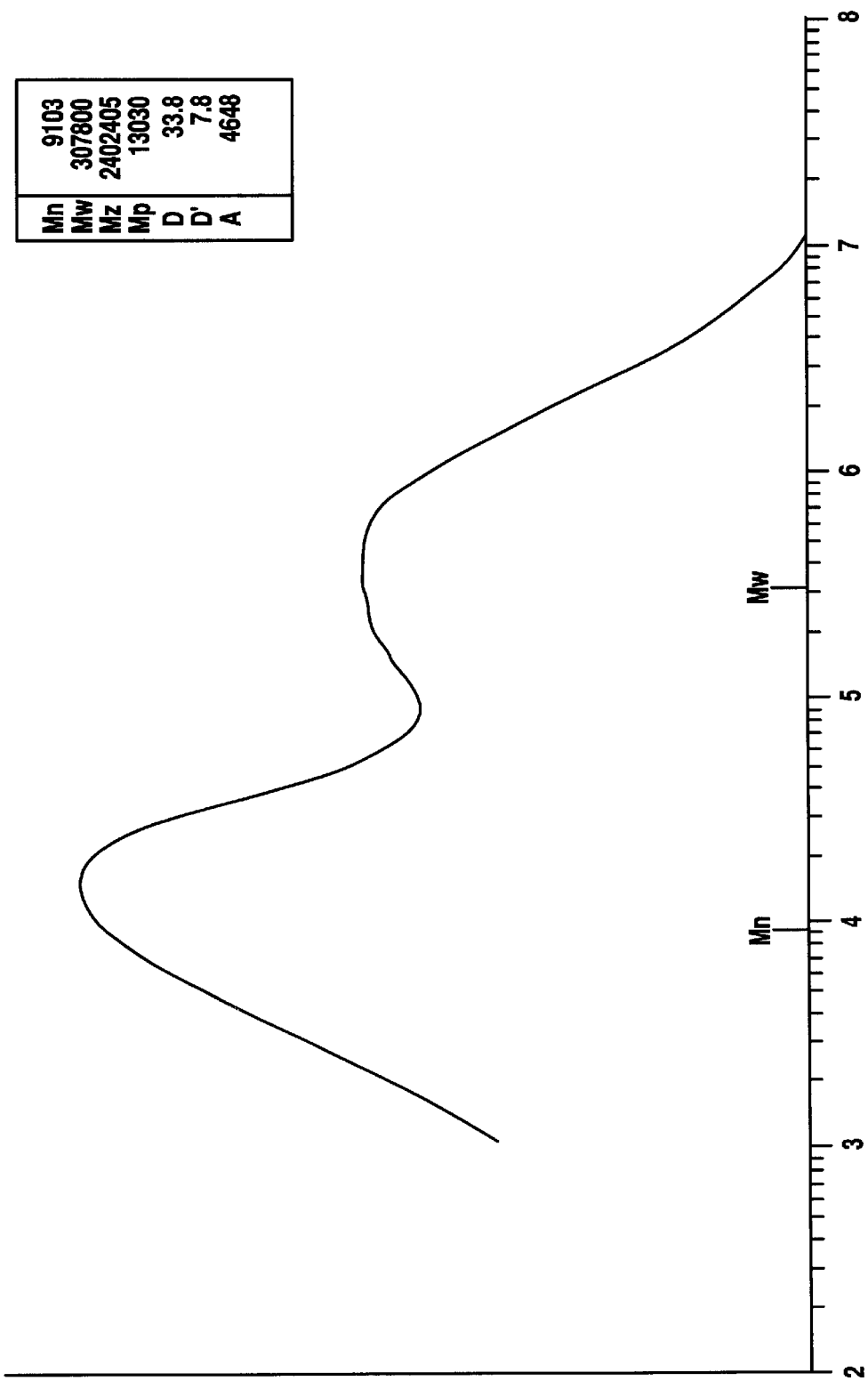
Figure 10:
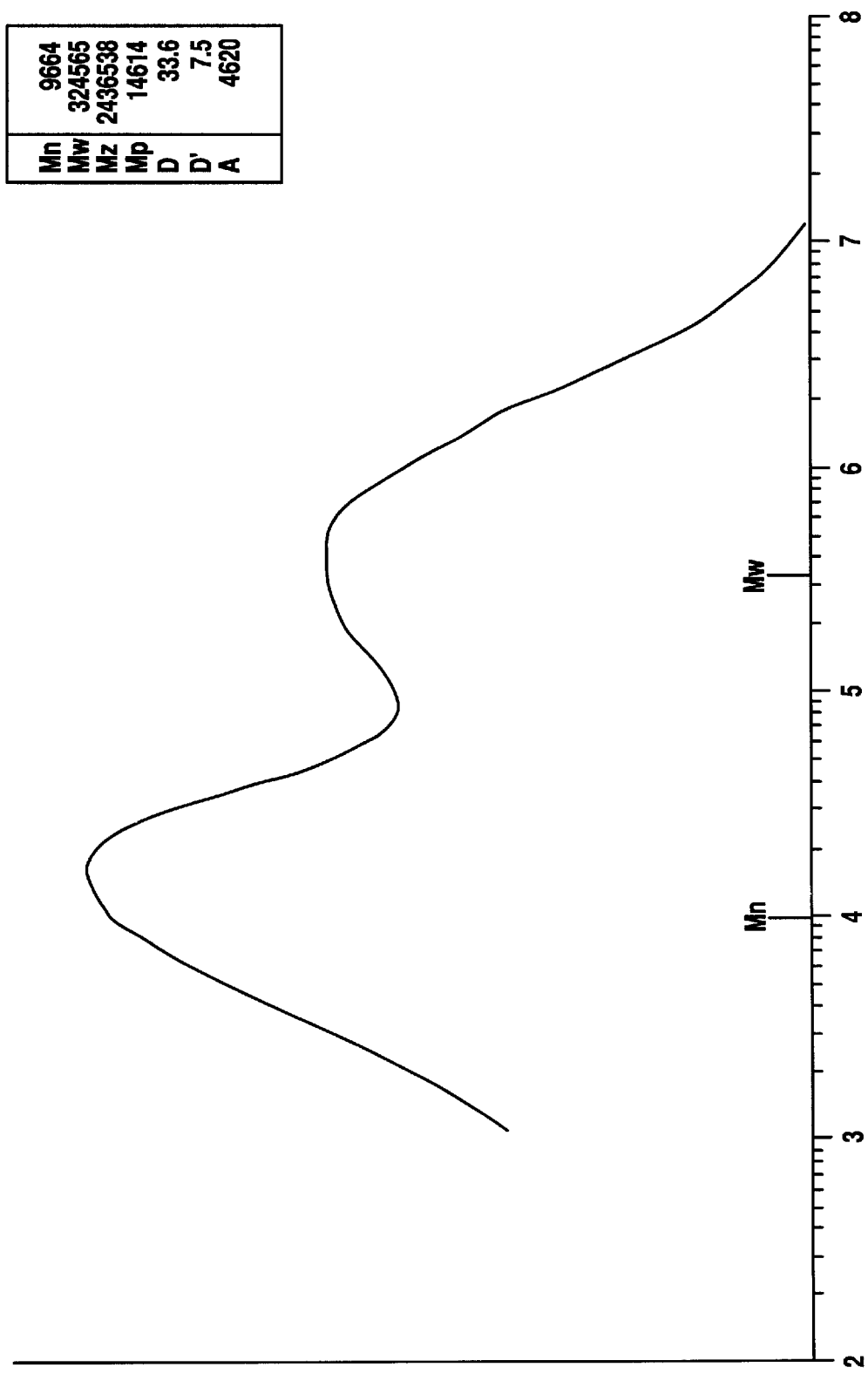
Figure 11:
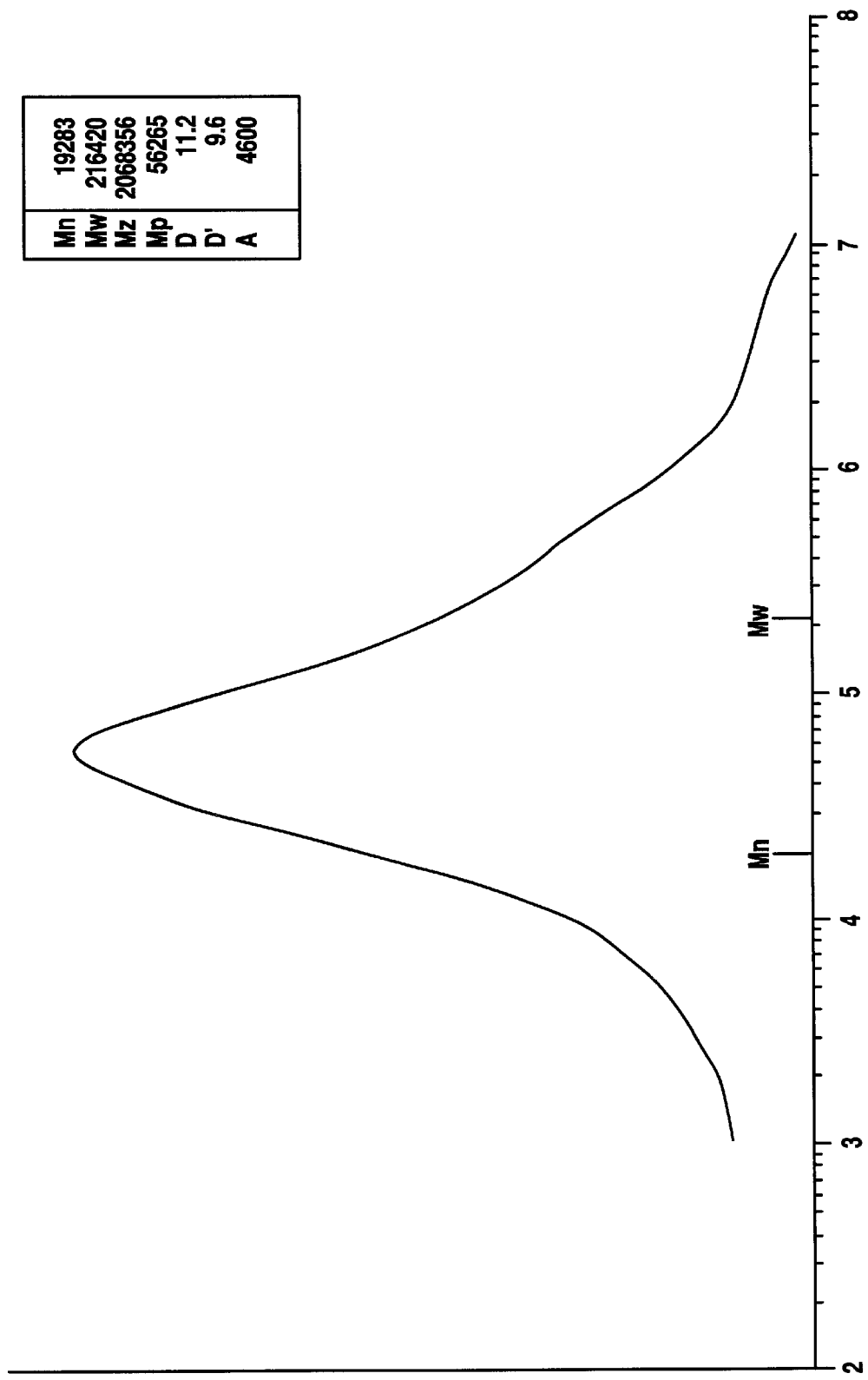
Figure 12:
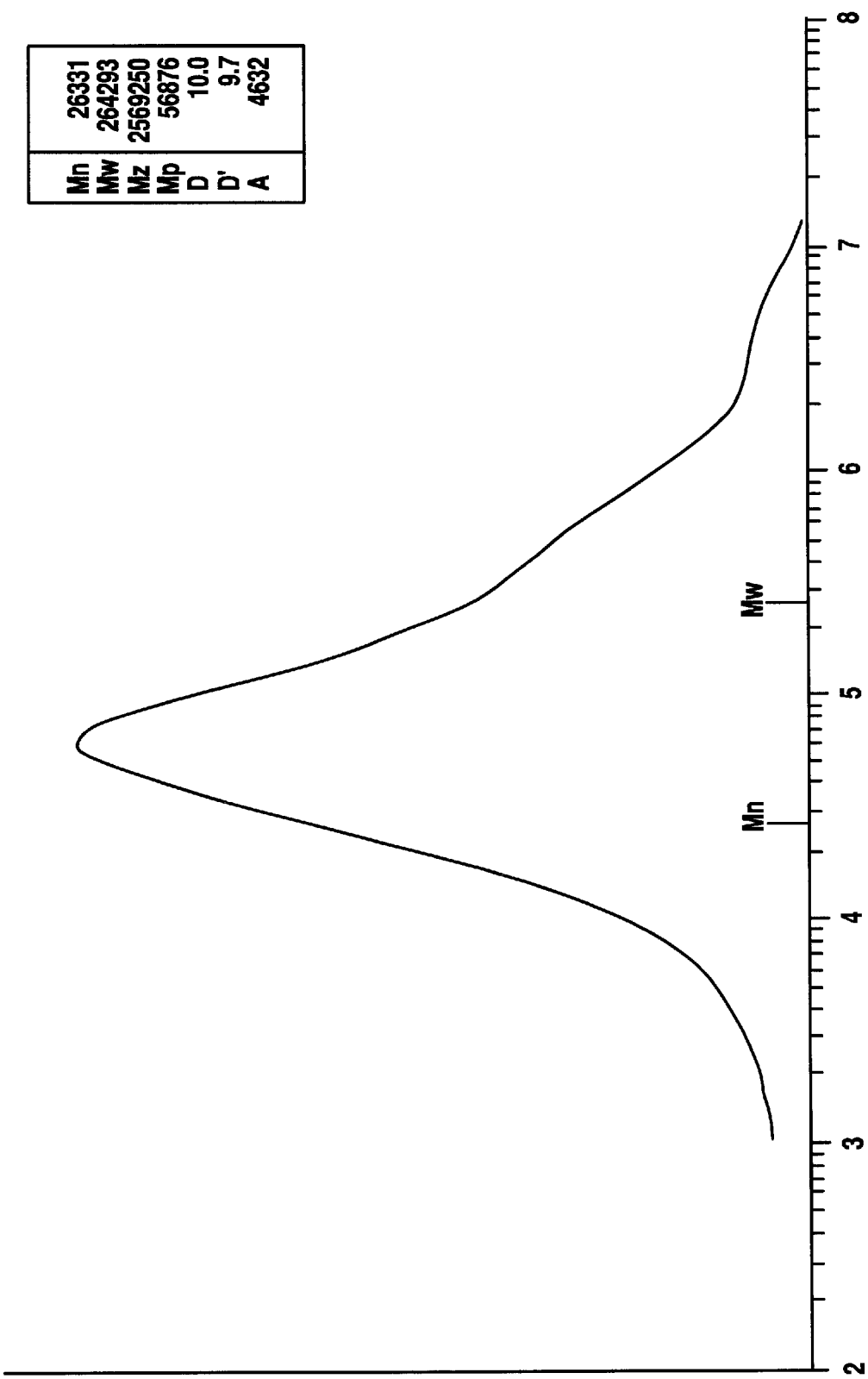
Figure 13:
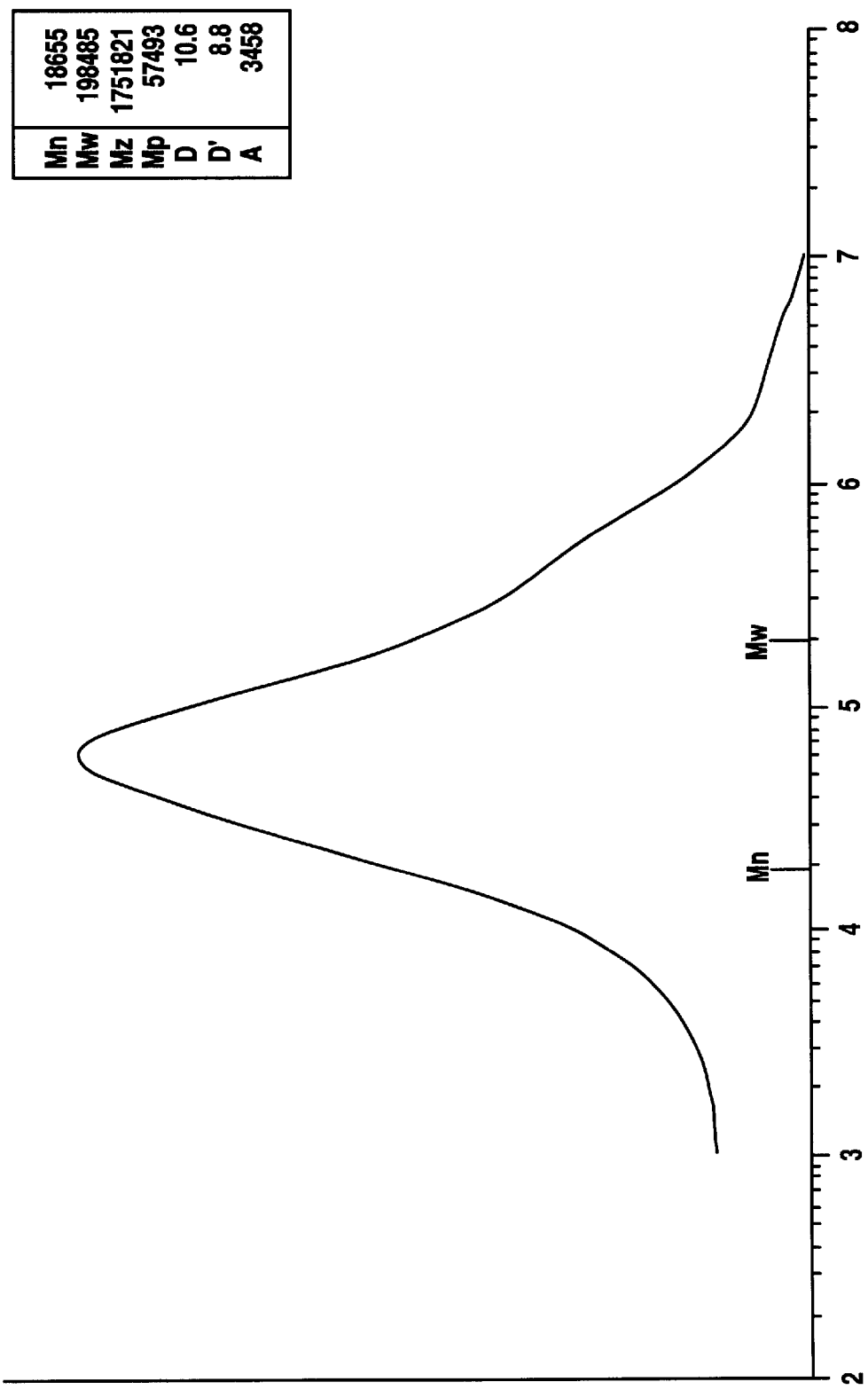
Figure 14:
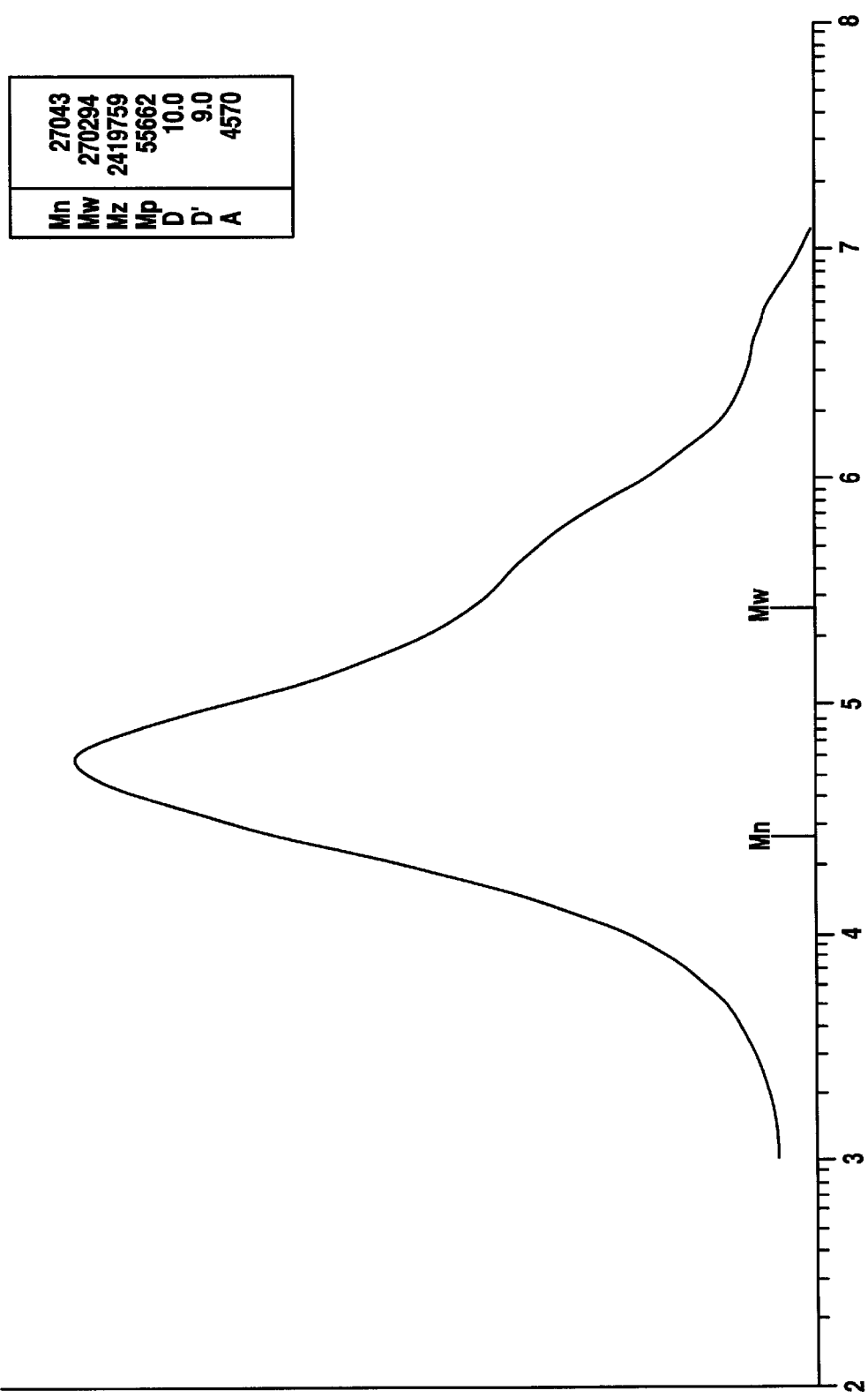
Figure 15:
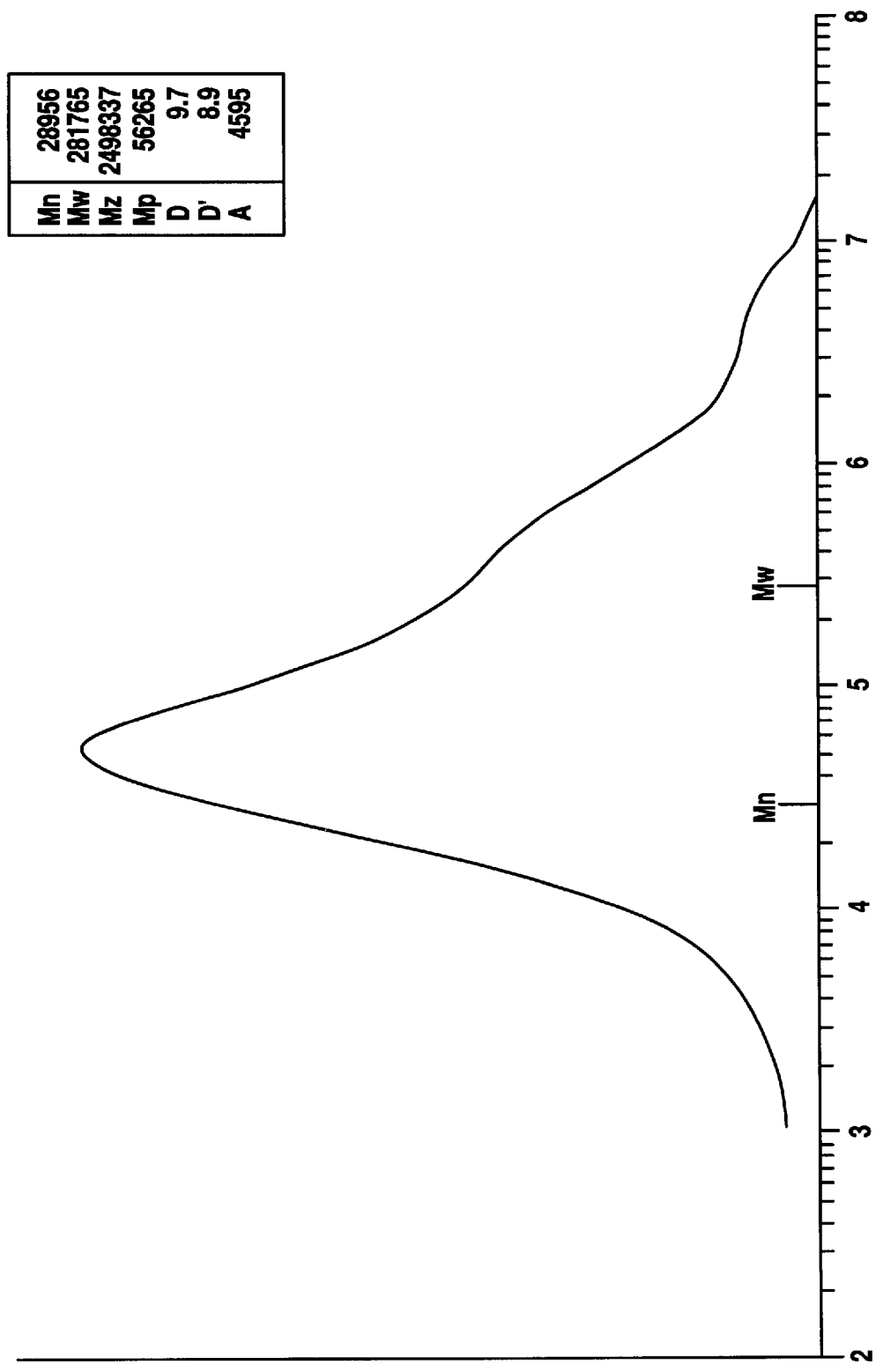
Figure 16:
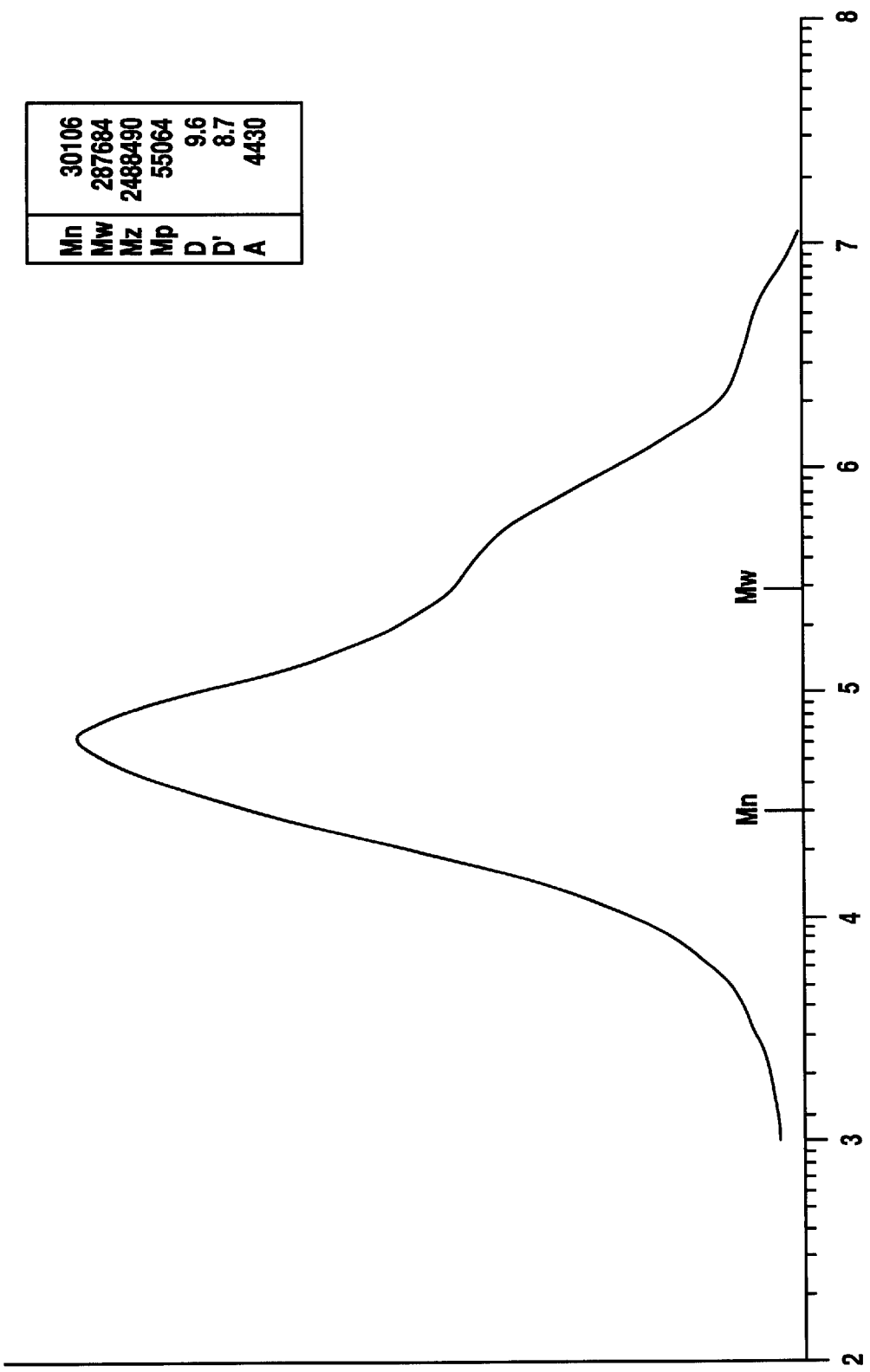
Figure 17:
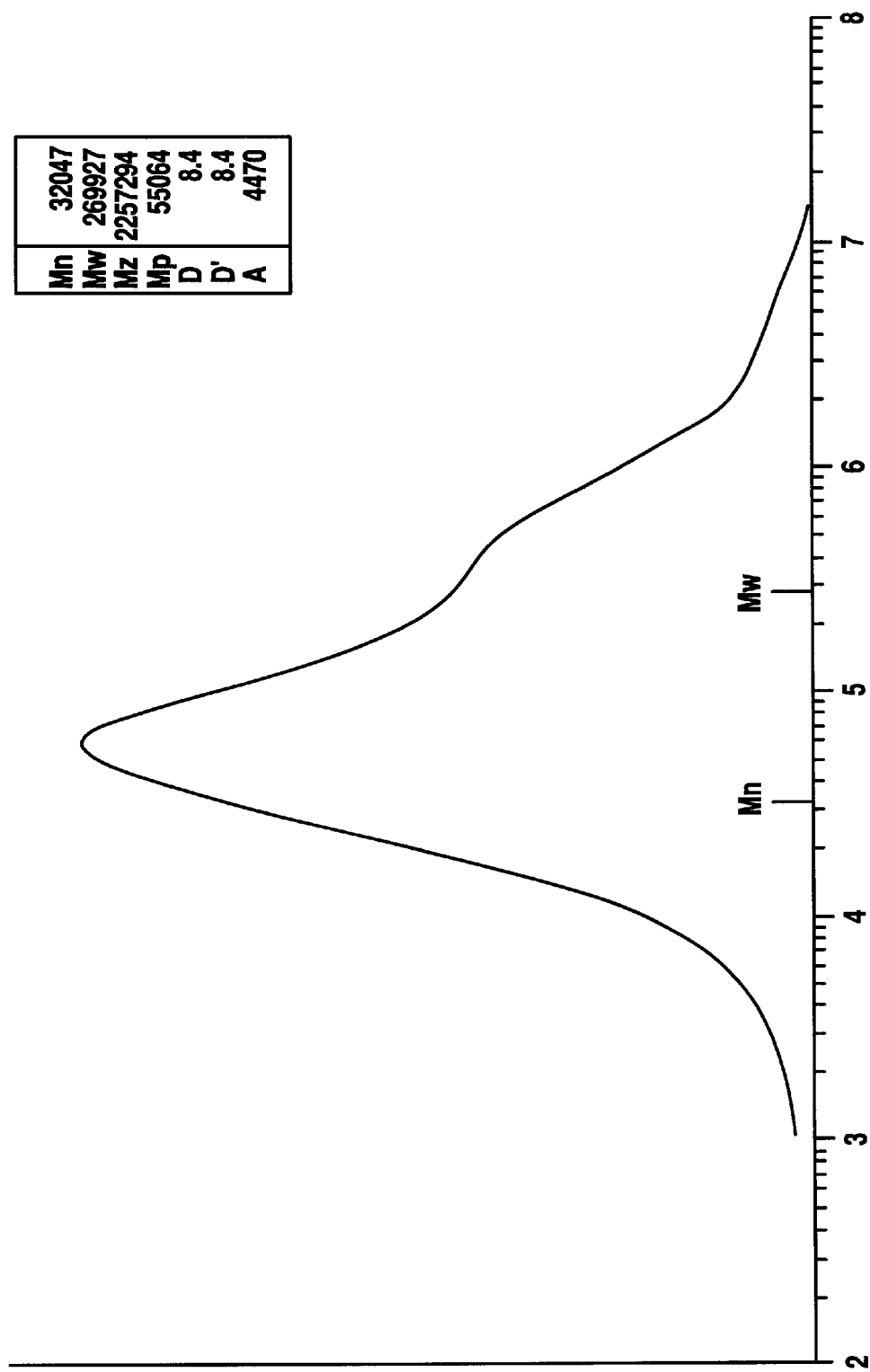
Figure 18:
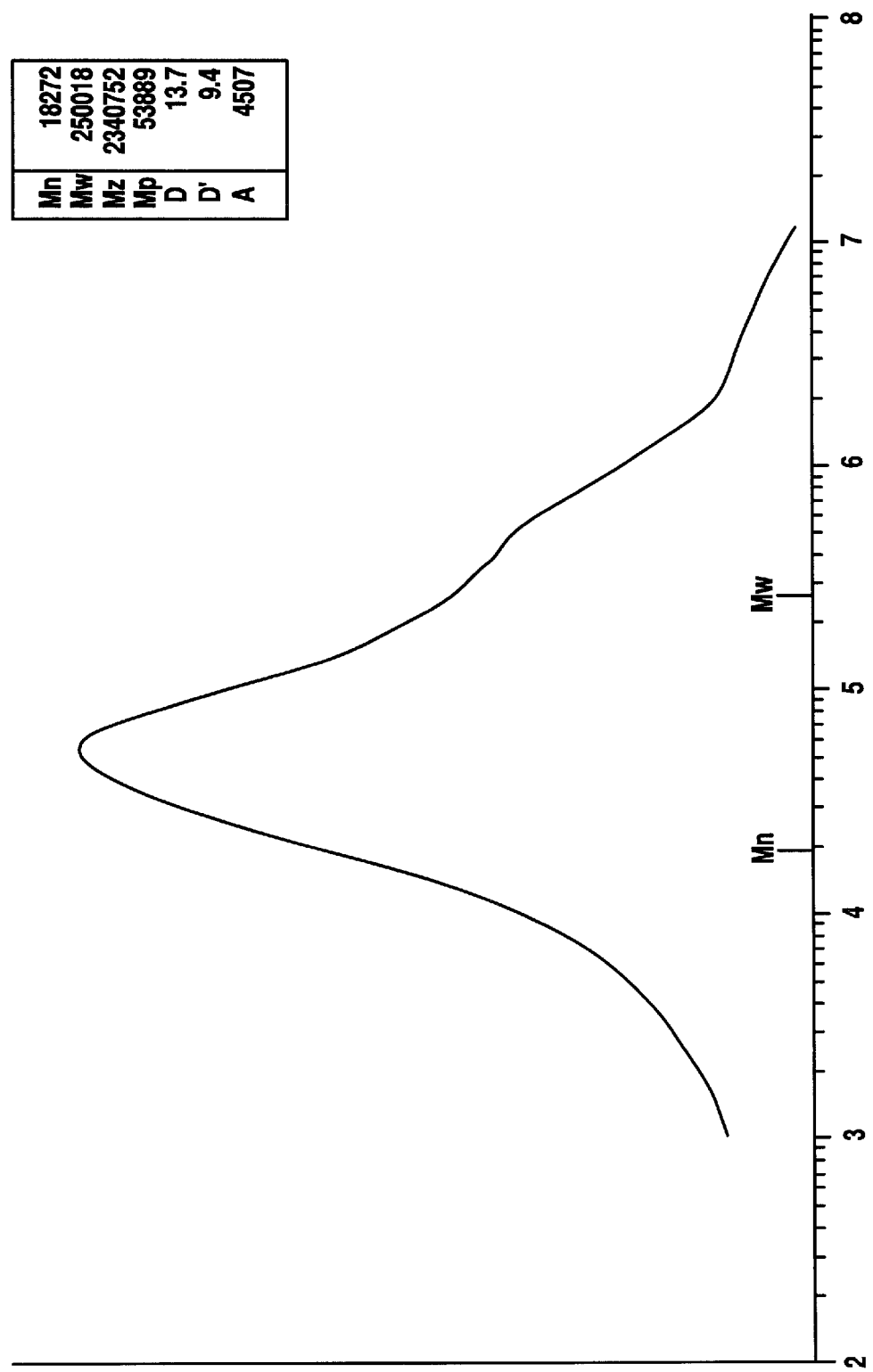
Figure 19:
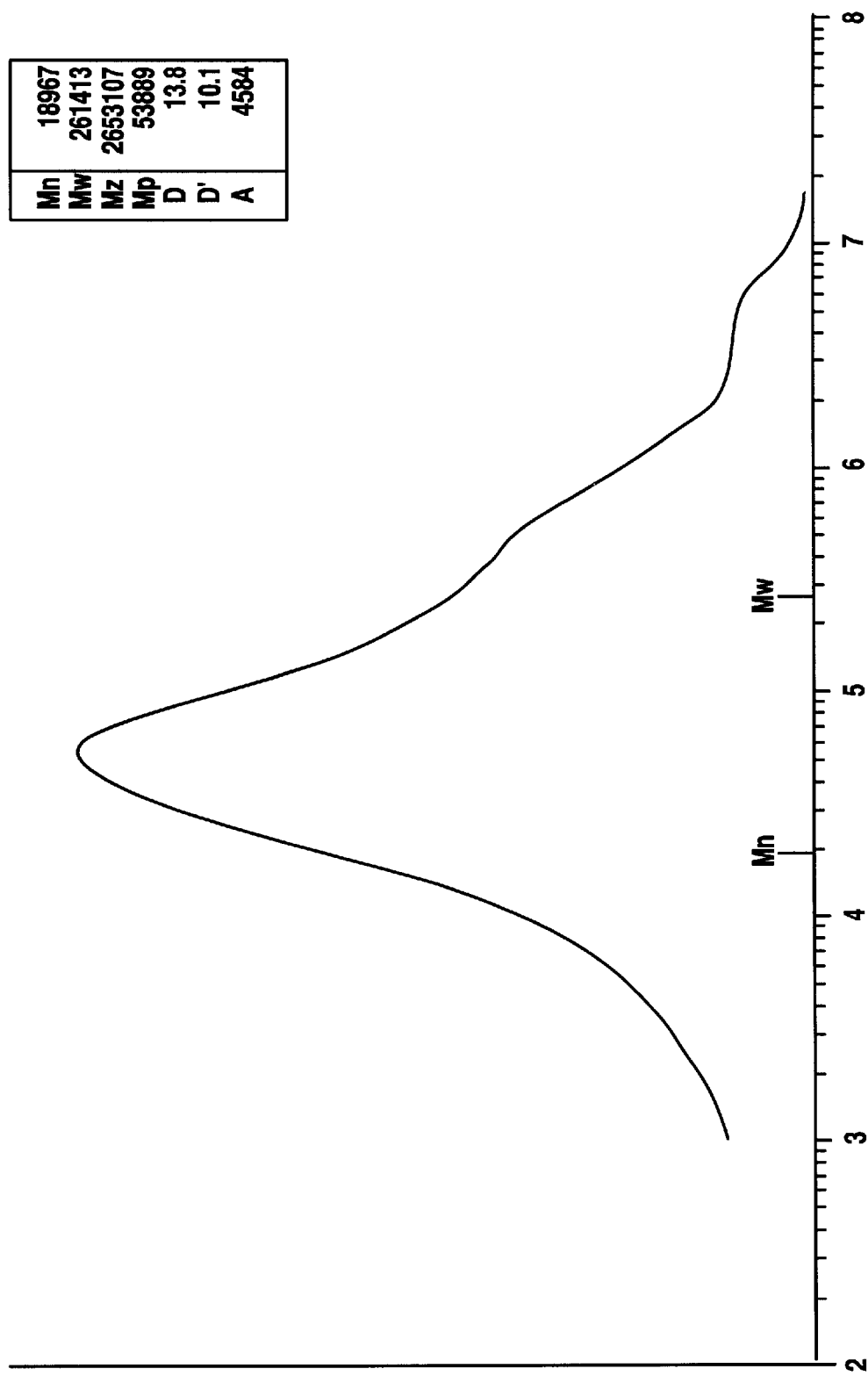
Figure 20:
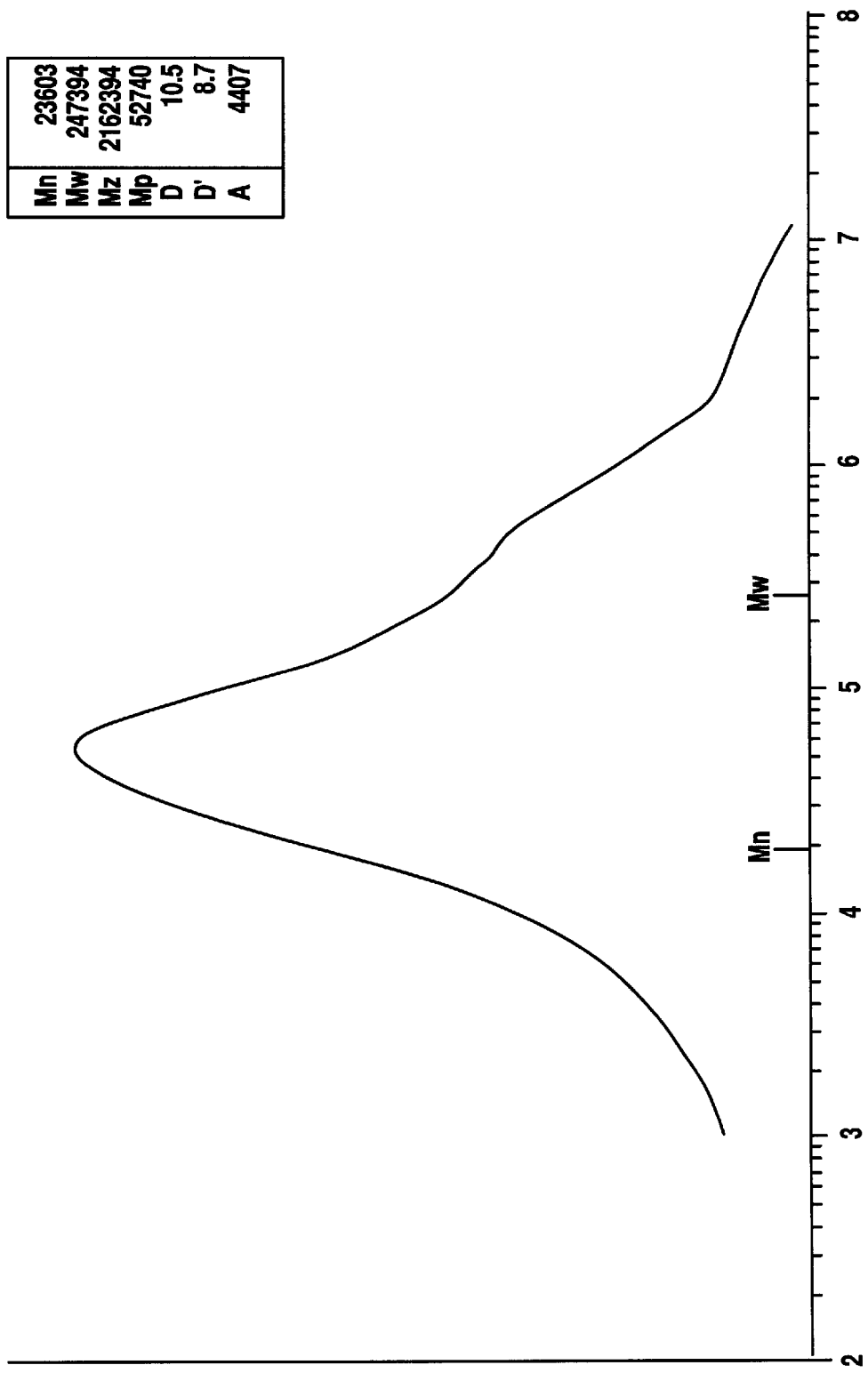

According to the present invention, the supported catalyst-component used in the process for producing polyolefins having multimodal molecular weight distribution can be made by any known method as long as it comprises an alumoxane and at least two metallocenes containing the same transition metal wherein at least one of the metallocenes is bridged and at least one of the metallocenes is unbridged.

Known processes of producing these types of catalysts are disclosed in European Patent No. 0206794, the content of which is incorporated by reference. This patent discloses a catalyst-component comprising the reaction product of at least one metallocene and alumoxane in the presence of a support material thereby providing a supported metallocene-alumoxane reaction product as the sole catalyst component.

The metallocenes used in the process of the present invention are organometallic coordination compounds which are cyclopentadienyl derivatives of a Group 4b, 5b or 6b metal of the Periodic Table and include mono, di and tricyclopentadienyls and their derivatives of the transition metals. Particularly desirable are the metallocene of a Group 4b and 5b metal such as titanium, zirconium, hafnium and vanadium.

The preferred metallocenes can be represented by the general formulae:

I. $(Cp)_m MR_n X_q$ wherein Cp is a cyclopentadienyl ring, M is a Group 4b, 5b, or 6b transition metal, R is a hydrocarbyl group or hydrocarboxy having from 1 to 20 carbon atoms, X is a halogen, and m=1–3, n=0–3, q=0–3 and the sum of m+n+q will be equal to the oxidation state of the metal.

II. $(C_5R'_k)_g R''_s (C_5R'_k) MQ_{3-g}$ and

III. $R''_s (C_5R'_k)_2 MQ'$ wherein $(C_5R'_k)$ is a cyclopentadienyl or substituted cyclopentadienyl, each R' is the same or different and is hydrogen or hydrocarbyl radical such as alkyl, alkenyl, aryl, alkylaryl, or arylalkyl radical containing from 1 to 20 carbon atoms or two carbon atoms are joined together to form a $C_4-C_6$ ring, R" is a $C_1-C_4$ alkylene radical, a dialkyl germanium or silicon or siloxane, or an alkyl phosphine or amine radical bridging two $(C_5R'_k)$ rings, Q is a hydrocarbyl radical such as aryl, alkyl, alkenyl, alkylaryl, or aryl alkyl radical having from 1–20 carbon atoms, hydrocarboxy radical having 1–20 carbon atoms or halogen and can be the same or different from each other, Q' is an alkylidiene radical having from 1 to about 20 carbon atoms, s is 0 or 1, g is 0, 1 or 2, s is 0 when g is 0, k is 4 when s is 1 and k is 5 when s is 0, and M is as defined above.

Exemplar hydrocarbyl radicals are methyl, ethyl, propyl, butyl, amyl, isoamyl, hexyl, isobutyl, heptyl, octyl, nonyl, decyl, cetyl, 2-ethylhexyl, phenyl and the like. Example halogen atoms include chlorine, bromine, fluorine and iodine and of these halogen atoms, chlorine is preferred. Exemplary hydrocarboxy radicals are methoxy, ethoxy, propoxy, butoxy, amyloxy and the like. Exemplary of the alkylidiene radicals is methylidene, ethylidene and propylidene.

According to a preferred embodiment of the present invention, the catalyst-component comprises at least two metallocenes deposited on a support wherein:

At least one of the metallocenes is unbridged and is represented by the formula $(Cp)_2 MX_2$ wherein each Cp is the same or different and is selected from substituted or unsubstituted cyclopentadienyl, indenyl or fluorenyl, M is zirconium, titanium or hafnium and X, which is the same or different, is a hydrocarbyl radical such as aryl, alkyl, alkenyl, alkylaryl, or aryl alkyl radical having from 1–20 carbon atoms or a halogen.

At least one of the metallocenes is bridged and is represented by the formula $R''(Cp)_2 MW_2$ wherein each Cp is the same or different and is selected from substituted or unsubstituted cyclopentadienyl, indenyl or fluorenyl, M is zirconium, titanium or hafnium, X, which is the same or different, is a hydrocarbyl radical such as aryl, alkyl, alkenyl, alkylaryl, or aryl alkyl radical having from 1–20 carbon atoms or a halogen and R" is a $C_1-C_4$ alkylene radical, a dialkyl germanium or silicon or siloxane, or an alkyl phosphine or amine radical bridging two (Cp) rings.

Preferably, in the above-identified formulae, for the unbridged metallocene Cp is a substituted or unsubstituted cyclopentadienyl or indenyl, M is zirconium, titanium or hafnium and X is Cl or $CH_3$, and for the bridged metallocene Cp is a substituted or unsubstituted cyclopentadienyl, indenyl or fluorenyl, M is zirconium, titanium or hafnium, X is Cl or $CH_3$ and R" is an ethylene radical or silicon.

Preferably, the unbridged metallocene is a bis (cyclopentadienyl) zirconium dichloride and the bridged metallocene is an ethylene-bis(indenyl) zirconium dichloride.

The molar ratio of the unbridged metallocenes to the bridged metallocenes can vary over a wide range, and in accordance with the present invention, the only limitation on the molar ratio is the breadth of the molecular weight distribution (MWD) and the degree of bimodality desired in the product polymer. Preferably, the unbridged to bridged metallocenes molar ratio will be between 10:1 and 1:10, preferably between 5:1 and 1:5, more preferably between 4:1 and 2:1.

The alumoxanes used in the process of the present invention are well known and preferably comprise oligomeric linear and/or cyclic alkyl alumoxanes represented by the formula:

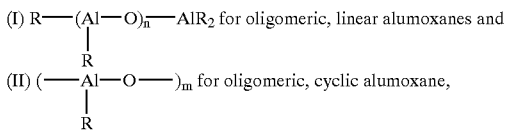

wherein n is 1–40, preferably 10–20, m is 3–40, preferably 3–20 and R is a $C_1$–$C_8$ alkyl group and preferably methyl. Generally, in the preparation of alumoxanes from, for example, aluminum trimethyl and water, a mixture of linear and cyclic compounds is obtained.

The support used in the process of the present invention can be any of the solid, particularly, porous supports such as talc, inorganic oxides, and resinous support materials such as polyolefin. Preferably, the support material is an inorganic oxide in its finely divided form. Suitable inorganic oxide materials which are desirably employed in accordance with this invention include Group 2a, 3a, 4a or 4b metal oxides such as silica, alumina and mixtures thereof. Other inorganic oxides that may be employed either alone or in combination with the silica or alumina are magnesia, titania, zirconia, and the like. Other suitable support materials, however, can be employed, for example, finely divided functionalized polyolefins such as finely divided polyethylene. Preferably, the support is a silica having a surface area comprised between 200 and 600 $m^2/g$ and a pore volume comprise between 0.5 and 3 ml/g.

The amount of alumoxane and metallocenes usefully employed in the preparation of the solid support catalyst can very over a wide range. Preferably the aluminum to transition metal mole ratio is comprised between 1:1 and 100:1, preferably between 5:1 and 50:1.

The order of addition of the metallocenes and alumoxane to the support material can vary. In accordance with a preferred embodiment of the present invention alumoxane dissolved in a suitable inert hydrocarbon solvent is added to the support material slurried in the same or other suitable hydrocarbon liquid and thereafter a mixture of the at least two metallocenes is added to the slurry.

According to a preferred embodiment of the present invention, the supported component catalyst is prepared by mixing together the unbridged metallocene alumoxane supported catalyst with the bridged metallocene alumoxane supported catalyst.

Preferred solvents include mineral oils and the various hydrocarbons which are liquid at reaction temperatures and which do not react with the individual ingredients. Illustrative examples of the useful solvents include the alkanes such as pentane, iso-pentane, hexane, heptane, octane and nonane; cycloalkanes such as cyclopentane and cyclohexane, and aromatics such as benzene, toluene, ethylbenzene and diethylbenzene. Preferably the support material is slurried in toluene and the metallocene and alumoxane are dissolved in toluene prior to addition to the support material.

The following examples are illustrative of the claimed invention and should not be interpretive as limiting the scope thereof.

EXAMPLES

1. Catalyst preparation (A)

The support used is a silica having a surface area of 322 $m^2/g$ (GRACE 952). This silica is further prepared by drying in high vacuum on a schlenk line for three hours to remove the physically absorbed water and then suspended in toluene to react with methyl alumoxane (MAO) for three hours at the reflux temperature. Finally it is cooled and washed three times with toluene to remove the unreacted MAO. A solution of the two corresponding metallocenes in toluene is added to the treated silica and the mixture is stirred for an hour. The supernatant liquid was filtered off and the remaining solid was dried under vacuum after being washed three times with toluene. Three minutes before the introduction of the catalyst into the reaction zone 1 ml of 25 wt % of triisobutylaluminium (TIBAL) in toluene is added. All polymerizations were performed in a two liter Buchi reactor in one liter of iso-butane as diluent.

2. Polymerization procedure (A)

A suspension of supported catalyst is introduced into the reactor under the iso-butane pressure. The polymerization is initiated by pressurizing the reactor with 30 bars of ethylene. The ethylene pressure is maintained during the whole duration of the polymerization. The polymerization is stopped by cooling the reactor and venting the ethylene. The polymer is recovered and analyzed. The catalyst type, the polymerization conditions and the polymer properties are given in Table 1.

3. Catalyst preparation (B)

The two supports used are MAO supported silica identical to the one prepared in method (A) hereabove.

(a) a solution of $(Cp)_2ZrCl_2$ in toluene is deposited on the first support by stirring the resulting suspension for one hour at ambient temperature. The supernatant liquid was filtered off and the remaining solid was dried under vacuum after being washed three times with toluene.

(b) a solution of $(Ind)_2ZrCl_2$ in toluene is deposited on the second support by stirring the resulting suspension for one hour at ambient temperature. The supernatant liquid was filtered off and the remaining solid was dried under vacuum after being washed three times with toluene.

(c) the two separately obtained supported metallocenes (a) and (b) were mixed together in a 2:1 weight ratio ((a):(b)).

4. Polymerization procedure (B)

The reactor used in all examples has a capacity of 35 liters and is continuously agitated. This continuous reactor is first filled with isobutane at a pressure of 40 bars. Then, as indicated in FIG. 1, a suspension of supported catalyst (1), isobutane (2), TIBAL (3), hexene (4), ethylene (5) and hydrogen (6) are continuously introduced into the reactor. The polymers are recovered at (9). All polymers were analyzed by Gel Permeation Chromatography (GPC-WATERS MILLIPORE) and Differential Scanning Calorimetry (DSC). The graphs are given in FIGS. 2 to 20 (FIGS. 2 to 20 respectively correspond to examples 5 to 23 of Table 2). "D" represents the ratio Mw/Mn (MWD), "D'" the ratio Mz/Mw and "A" the area under the curve. The polymerization conditions and the polymer properties are given in Table 2.

TABLE 1

| Example | Catalyst (mg) | Catalyst type | Hexene (ml) | Hydrogen (Nl) | Yield (g) | Activity (g/g.h) | Bulk (1) (g/cc) | MI₂ (2) (g/10') | HLMI (3) (g/10') | SRR (4) |
|---|---|---|---|---|---|---|---|---|---|---|
| 1 | 52 | (B) | 10 | 4.5 | 100 | 1025 | 0.3 | (a) | (a) | (b) |
|  | 99 | (A) |  |  |  |  |  |  |  |  |
| 2 | 50 | (B) | 10 | 1 | 135 | 1126 | 0.27 | 1.15 | 49.5 | 43.04 |
|  | 100 | (A) |  |  |  |  |  |  |  |  |
| 3 (x) | 50 | (B) | 10 | 2.5 | 120 | 946 | 0.3 | 0.61 | 23.9 | 39.18 |
|  | 100 | (A) |  |  |  |  |  |  |  |  |
| 4 | 50 | (B) | 5 | 1 | 170 | 662 | 0.25 | 0.58 | 22.3 | 38.44 |
|  | 100 | (A) |  |  |  |  |  |  |  |  |

(A) bis(cyclopentadienyl) zirconium dichloride
(B) ethylene-bis(indenyl) zirconium dichloride
(x) precontact time of 45 minutes between catalyst and cocatalyst before polymerization
(1) Bulk Density (ASTM-D-1895)
(2) Melt Index (ASTM-D-1238-89A)
(3) High Load Melt Index (ASTM-D-1238-89A)
(4) Shear Rate Response (HLMI/MI₂)
(a) too high to be measured
(b) non determined

| Example | Catalyst (mg) | Catalyst type | Density (1) (g/cc) | Mz x10E3 | Mw x10E3 | Mn x10E3 | MWD | MP (2) (°C.) | H (3) (J/g) |
|---|---|---|---|---|---|---|---|---|---|
| 1 | 52 | (B) | (b) | (b) | (b) | (b) | (b) | 127.8 | 192 |
|  | 99 | (A) |  |  |  |  |  |  |  |
| 2 | 50 | (B) | 0.9521 | (b) | (b) | (b) | (b) | 131 | 180 |
|  | 100 | (A) |  |  |  |  |  |  |  |
| 3 (x) | 50 | (B) | 0.9518 | 1100 | 137 | 12 | 11 | 132.3 | 189.5 |
|  | 100 | (A) |  |  |  |  |  |  |  |
| 4 | 50 | (B) | 0.9408 | 1230 | 132 | 15.5 | 8.5 | 133 | 191.2 |
|  | 100 | (A) |  |  |  |  |  |  |  |

(A) bis(cyclopentadienyl) zirconium dichloride
(B) ethylene-bis(indenyl) zirconium dichloride
(x) precontact time of 45 minutes between catalyst and cocatalyst before polymerization
(1) ASTM-D-1505-85
(2) Melting Point (DSC)
(3) Enthalpy of fusion (DSC)
(b) non determined

TABLE 2

| Ex | Cata (g/h) | TIBAL (g/h) | i-C₄ (kg/h) | C₂ (kg/h) | C₆ (cc/h) | H₂ (Nl/h) | Bulk (1) (g/cc) | MI (2) (g/10') | HLMI (3) (g/10') | SRR (4) | D (5) (g/cc) | Mz x10E3 | Mw x10E3 | Mn x10E3 | MWD |
|---|---|---|---|---|---|---|---|---|---|---|---|---|---|---|---|
| 5 | 4.5 | 7.2 | 18 | 3 | 0 | 33 | 0.38 | 0.22 | 45.9 | 204 | 0.965 | 2213 | 254 | 7.7 | 33.0 |
| 6 | 4.5 | 7.2 | 18 | 2.5 | 0 | 14 | 0.37 | 0.12 | 30.6 | 251 | 0.963 | 2492 | 300 | 9.0 | 33.3 |
| 7 | 4.5 | 7.2 | 18 | 2.5 | 0 | 15 | 0.37 | 0.05 | 13.9 | 259 | 0.965 | 2699 | 357 | 10.2 | 35.0 |
| 8 | 4.5 | 7.2 | 18 | 2.5 | 0 | 15 | 0.35 | 0.05 | 13.6 | 300 | 0.964 | 2868 | 381 | 10.2 | 37.4 |
| 9 | 4.5 | 7.2 | 16 | 2 | 268 | 15 | 0.38 | 0.07 | 15.7 | 225 | 0.958 | 2644 | 337 | 9.4 | 35.7 |
| 10 | 4.5 | 7.2 | 16 | 2 | 265 | 15 | 0.39 | 0.09 | 23.9 | 266 | 0.959 | 2486 | 323 | 9.4 | 34.5 |
| 11 | 4.5 | 7.2 | 16 | 2 | 270 | 15 | 0.39 | 0.08 | 24.0 | 312 | 0.958 | 2390 | 307 | 9.0 | 34.1 |
| 12 | 4.5 | 7.2 | 16 | 2 | 274 | 15 | 0.39 | 0.11 | 24.8 | 232 | 0.958 | 2402 | 308 | 9.1 | 33.8 |
| 13 | 4.5 | 7.2 | 16 | 2 | 268 | 15 | 0.39 | 0.10 | 24.5 | 255 | 0.959 | 2437 | 325 | 9.7 | 33.6 |

Catalyst preparation (B)
(1) Bulk Density (ASTM-D-1895)
(2) Melt Index (ASTM-D-1238-89A)
(3) High Load Melt Index (ASTM-D-1238-89A)
(4) Shear Rate Response (HLMI/MI₂)
(5) Density (ASTM-D-1505-85)
TIBAL triisobutylaluminium, i-C₄ isobutane, C₂ ethylene, C₆ hexene TABLE 2-continued

| Ex | Cata (g/h) | TIBAL (g/h) | i-$C_4$ (kg/h) | $C_2$ (kg/h) | $C_6$ (cc/h) | $H_2$ (Nl/h) | Bulk (1) (g/cc) | $MI_2$ (2) (g/10') | HLMI (3) (g/10') | SRR (4) | D (5) (g/cc) | Mz x10E3 | Mw x10E3 | Mn x10E3 | MWD |
|----|------|------|------|------|------|------|------|------|------|-----|------|------|------|------|------|
| 14 | 4.5 | 7.2 | 18 | 2 | 0 | 0 | 0.30 | 0.16 | 11.8 | 74 | 0.951 | 2068 | 216 | 19.3 | 11.2 |
| 15 | 4.5 | 7.2 | 18 | 2 | 0 | 0 | 0.28 | 0.08 | 6.5 | 80 | 0.951 | 2569 | 264 | 26.3 | 10.0 |
| 16 | 4.5 | 7.2 | 18 | 2 | 0 | 0 | 0.28 | 0.14 | 9.6 | 69 | 0.951 | 1751 | 198 | 18.7 | 10.6 |
| 17 | 4.5 | 7.2 | 18 | 2.5 | 198 | 0 | 0.30 | 0.09 | 7.4 | 80 | 0.945 | 2419 | 270 | 27.0 | 10.0 |
| 18 | 4.5 | 7.2 | 18 | 2.5 | 200 | 0 | 0.30 | 0.07 | 6.1 | 94 | 0.941 | 2498 | 282 | 29.0 | 9.7 |
| 19 | 4.5 | 7.2 | 18 | 2.5 | 205 | 0 | 0.30 | 0.05 | 5.6 | 110 | 0.941 | 2488 | 238 | 30.1 | 9.6 |
| 20 | 4.5 | 7.2 | 18 | 2.5 | 207 | 0 | 0.30 | 0.05 | 5.1 | 97 | 0.939 | 2257 | 270 | 32.0 | 8.4 |
| 21 | 4.5 | 7.2 | 16 | 2 | 202 | 10 | 0.30 | 0.13 | 11.4 | 87 | 0.945 | 2341 | 230 | 18.3 | 13.7 |
| 22 | 4.5 | 7.2 | 16 | 2 | 210 | 10 | 0.30 | 0.11 | 9.1 | 78 | 0.946 | 2653 | 261 | 19.0 | 13.8 |
| 23 | 4.5 | 7.2 | 16 | 2 | 200 | 12 | 0.29 | 0.10 | 7.9 | 78 | 0.942 | 2162 | 247 | 23.6 | 10.5 |

Catalyst preparation (B)
(1) Bulk Density (ASTM-D-1895)
(2) Melt Index (ASTM-D-1238-89A)
(3) High Load Melt Index (ASTM-D-1238-89A)
(4) Shear Rate Ratio (HLMI/$MI_2$)
(5) Density (ASTM-D-1505-85)
TIBAL triisobutylaluminium, i-$C_4$ isobutane, $C_2$ ethylene, $C_6$ hexene

What is claimed is:

1. A catalyst system effective in the preparation of polyolefins having a multimodal or at least bimodal molecular weight distribution comprising a supported catalyst-component comprising an alumoxane and at least two supported metallocenes effective for olefin polymerization containing the same transition metal and selected from the group consisting of mono, di, and tri-cyclopentadienyls and substituted cyclopentadienyls of a Group 4b, 5b, or 6b transition metal wherein at least one of the metallocenes is bridged and at least one of the metallocenes is unbridged wherein said supported catalyst component comprises two metallocenes collectively supported on the same support and is prepared by the process of adding a solution of the two metallocenes to said same support.

2. The catalyst system of claim 1, wherein said supported catalyst components is prepared by the process in which said alumoxane is added to said support prior to said solution of said metallocenes.

3. A catalyst system effective in the preparation of polyolefins having a multimodal or at least bimodal molecular weight distribution comprising a supported catalyst-component comprising an alumoxane and at least two supported metallocenes effective for olefin polymerization containing the same transition metal and selected from the group consisting of mono, di, and tri-cyclopentadienyls and substituted cyclopentadienyls of a Group 4b, 5b, or 6b transition metal wherein at least one of the metallocenes is bridged and at least one of the metallocenes is unbridged wherein said supported catalyst component is prepared by the process of depositing said bridged metallocene on a first support and separately depositing said unbridged metallocene on a second support and mixing said separately supported metallocenes in their support together.

4. The catalyst system of claim 3, wherein said supported catalyst component is prepared by the process in which said alumoxane is added to said first and second supports prior to the deposition of said metallocenes on said supports.

* * * * *

UNITED STATES PATENT AND TRADEMARK OFFICE
CERTIFICATE OF CORRECTION

PATENT NO. : 6,541,413 B1
DATED : April 1, 2003
INVENTOR(S) : Abbas Razavi and Guy L.G. Debras It is certified that error appears in the above-identified patent and that said Letters Patent is hereby corrected as shown below:

Column 4,
Line 30, replace "Exemplar" with -- Exemplary --;
Line 31, replace "Example" with -- Exemplary --;

Column 9 and 10,
TABLE 2-continued: replace the value at the intersection of the row 21 and column Mw x 10E3 "230" with -- 250 --.

Signed and Sealed this

Third Day of February, 2004

JON W. DUDAS
*Acting Director of the United States Patent and Trademark Office*